(12) United States Patent
Evers et al.

(10) Patent No.: US 6,542,975 B1
(45) Date of Patent: Apr. 1, 2003

(54) METHOD AND SYSTEM FOR BACKING UP DATA OVER A PLURALITY OF VOLUMES

(75) Inventors: Daniel L. Evers, Casselberry, FL (US); Daniel A. Polfer, Winter Park, FL (US); Thomas G. Halloran, Oviedo, FL (US); Michael D. Berhan, San Jose, CA (US)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 09/329,516

(22) Filed: Jun. 10, 1999

Related U.S. Application Data
(60) Provisional application No. 60/113,694, filed on Dec. 24, 1998.

(51) Int. Cl.[7] .............................................. G06F 12/00
(52) U.S. Cl. ..................... 711/162; 711/156; 711/112; 711/173
(58) Field of Search ................................. 711/162, 161, 711/155, 156, 111, 112, 173; 707/204, 205

(56) References Cited

U.S. PATENT DOCUMENTS

| | | | | |
|---|---|---|---|---|
| 5,455,926 A | * | 10/1995 | Keele et al. ................. | 711/112 |
| 5,581,724 A | * | 12/1996 | Belsan et al. ............... | 711/114 |
| 5,907,672 A | * | 5/1999 | Matze et al. ................ | 711/162 |
| 6,108,759 A | * | 8/2000 | Orcutt et al. ............... | 711/173 |

\* cited by examiner

*Primary Examiner*—Matthew Kim
*Assistant Examiner*—Matthew D. Anderson
(74) *Attorney, Agent, or Firm*—Martine & Penilla, LLP

(57) ABSTRACT

Disclosed is a method and system for backing up image data from one or more partitions of a storage device onto one or more backup media. Each backup medium defines backup volume having a predetermined storage capacity with each partition having a plurality of sectors. The method includes: (a) reading the sectors of a selected partition of the storage device for backup in the one or more backup volumes, wherein a set of the sectors read from the selected partition defines a data chunk for processing the sectors as data chunks; (b) sequentially storing a set of the data chunks in the order read from the partition in a selected backup volume; (c) generating and storing data chunk descriptors configured to reference the stored data chunks in the volume, one data chunk descriptor per data chunk, the data chunk descriptors being stored in the selected backup volume after storing all of the set of data chunks; and (d) generating and storing address data descriptors configured to reference at least one of the stored data chunks and at least one of the data chunk descriptors in the selected backup volume, the address data descriptors being stored in the selected backup volume after storing the data chunk descriptors.

34 Claims, 8 Drawing Sheets

METHOD AND SYSTEM FOR BACKING UP DATA OVER A PLURALITY OF VOLUMES

CROSS REFERENCE TO RELATED APPLICATION

The present application claims benefit of U.S. Provisional Patent Application No. 60/113,694, entitled "File Format for Efficient Media Backup," by Daniel Polfer et al., filed on Dec. 24, 1998. This application is incorporated herein by reference.

BACKGROUND OF THE INVENTION

1. Field of the Invention

This invention relates generally to disk drive backup systems and, more particularly, to image backup methods for backing up data from disk partitions of storage devices.

2. Description of the Related Art

Modern computer systems typically include one or more mass storage devices such as hard disk drives, optical disc drives, floppy disk drives, removable disk drives, and the like to store a large amount of information. Often, however, the storage devices fail to operate properly for various electromechanical defects. In the event of such failures, valuable data stored on the storage devices may be lost permanently or may require costly and time consuming repairs to recover the original data.

To guard against such failures, modern computer systems typically employ a backup system to backup data stored on a storage device. FIG. 1 illustrates an exemplary computer system 100 including a host computer 102 and a backup device 104. The backup device 104 is coupled to the host computer 102 by means of a bus 106 for backing up the contents of one or more storage devices (e.g., hard disk drives, optical drives, etc.) in the host computer 102. The backup device 104 then provides the backed up data to the host computer 102 to restore the original data when necessary. For example, data may be restored from the backup device when a backed up hard drive fails or when data on a backed up hard drive become corrupted.

The storage devices such as fixed disk drives (e.g., hard disk drives, removable disk drives, etc.) generally include one or more disks for storing data. For example, conventional hard disk drives include one or more disks that are partitioned into one or more partitions (e.g., volumes, logical drives, etc.), which is well known in the art. Each of the disk partitions is a logically self-contained volume and is typically represented by a drive letter such as "C," "D," "E," or the like. In addition, each partition contains files and directory bit maps such as file allocation table or the like. Typically, a partition is organized as a linear sequence of clusters, each of which is comprised of a number (i.e., set) of sectors.

FIG. 2A illustrates a schematic diagram of an exemplary disk 200 for storing data. The disk 200 is configured to include a plurality of tracks 202. Each of the tracks 202 is divided into sectors 204 for storing data. The disk 200 may be partitioned into one or more partitions with each partition having a file allocation data structure such as a file allocation table.

As is well known in the art, the partitions of a disk are generally organized in sectors. FIG. 2B shows a schematic diagram of an exemplary track 202 divided into sectors 204. A sector may be any size, but is typically 512 bytes in size. In this arrangement, files are configured to be stored in the disk 200 in units of clusters 206. Each of the clusters 206 includes a pair of sectors 204. As is well known in the art, however, a cluster may include any number of number of contiguous sectors typically in powers of two (e.g., 1, 2, 4, 8, 16, etc.).

In general, data in a storage device are backed up using one of two techniques: file-based backup and image-based backup. In the file-based backup method, the contents of individual files are copied from a source disk onto a backup media. The files are usually copied without regard for how they are arranged on the source disk. For example, a partition may have ten sectors containing two files. One file is stored in sectors two through four and sectors eight and nine while the other file is stored in sectors five through seven. The remaining sectors zero and one are unused. In this case, the file-based backup would store information in the backup in the following sequence: sectors two through four, eight and nine, five through seven, such that the unused sectors zero and one are not copied.

The file-based backup method, however, may require a substantial number of non-sequential read and write operations to back up an entire partition since a partition often contains hundreds or even thousands of files. For example, to back up the former file in sectors two through four and sectors eight and nine, a backup system reads sectors two through four first, and then performs a seek to sector eight for reading sectors eight and nine. Such non-sequential read and write operations entail numerous seek operations to proper sectors of clusters.

In contrast, the image-based backup method generally reduces the time required to backup an entire partition. Image-based backup systems are capable of backing up one or more partitions in a disk. In this method, all data on the partition, including valid data, free space, and invalid data, are copied and stored on a backup medium. For example, to perform an image backup of a partition "C," the image-based backup method operates to read and store the data on the partition sequentially from beginning sector to the end. By thus reading and storing the sectors linearly, seek operations are minimized. Hence, the backup time is typically reduced in comparison with the file-based backup technique.

Some examples of conventional backup media are magnetic tapes, magnetic disks, optical disks, etc. In performing image backups, conventional image-based backup methods typically use a backup medium that has a larger data capacity than the source disk to be backed up. For example, a backup medium of at least one GB is commonly used to backup a partition of a one Gigabytes (GB) source disk.

As the size of disks increases in size, however, a backup medium may not be able to store an entire image copy of a partition in a disk. This problem is exacerbated for a backup medium having a standardized data storing capacity. For example, optical disk drives such as CD-ROM recordable and rewritable media typically have a maximum capacity of about 650 Megabytes (MB) in accordance with industry standards. When the capacity of a partition to be backed up exceeds the capacity of individual backup medium, the partition is typically backed up over multiple backup media called volumes (e.g., discs). In this case, the image backup is spanned over multiple files or volumes until the entire partition has been backed up. The full group of volumes that make up the full backup data set is often referred to as a backup set.

Unfortunately, however, conventional spanning backup methods have several drawbacks. For example, the conventional spanning method takes substantial amount of time to backup and restore data when used with relatively slow optical disc drives such as CD-ROM rewritable or recordable drives, which are typically characterized by significantly larger seek times than hard disk drives. Since the backup and restore operations are often performed in a non-sequential manner, the larger seek times of the optical disc drives thereby increase the time needed to perform backup and restore operations.

In addition, some conventional backup media such as CD-ROM recordable discs are configured to be written only once. For example, once a data has been recorded on a write-once medium, no data can be written over the recorded data. That is, data may only be added and not edited. When a part of the data that have been written needs to be changed, the entire file needs to be rewritten. This rewriting of the file data directly translates into substantial cost in disc space and time, thereby degrading backup performance.

In view of the foregoing, what is needed is an image backup method and system for backing up data of one or more partitions to support spanning over multiple volumes while optimizing for sequential writing and reading to and from the back up media to save storage space and backup performance.

SUMMARY OF THE INVENTION

The present invention fills these needs by providing a method and system for backing up data over a plurality of volumes. It should be appreciated that the present invention can be implemented in numerous ways, including as a process, an apparatus, a system, a device, a method, or a computer readable medium. Several inventive embodiments of the present invention are described below.

In accordance with one aspect of the invention, the present invention provides a method for backing up image data from one or more partitions of a storage device onto one or more backup media. Each backup medium defines backup volume having a predetermined storage capacity with each partition having a plurality of sectors. The method includes: (a) reading the sectors of a selected partition of the storage device for backup in the one or more backup volumes, wherein a set of the sectors read from the selected partition defines a data chunk for processing the sectors as data chunks; (b) sequentially storing a set of the data chunks in the order read from the partition in a selected backup volume; (c) generating and storing data chunk descriptors configured to reference the stored data chunks in the volume, one data chunk descriptor per data chunk, the data chunk descriptors being stored in the selected backup volume after storing all of the set of data chunks; and (d) generating and storing address data descriptors configured to reference at least one of the stored data chunks and at least one of the data chunk descriptors in the selected backup volume, the address data descriptors being stored in the selected backup volume after storing the data chunk descriptors.

In accordance with another aspect of the present invention, a computer system is provided for backing up data from one or more partitions of a storage device onto one or more backup media. Each partition in the storage device has a plurality of sectors and each backup medium defines a backup volume having a predetermined storage capacity. The system includes a processor coupled to a bus, a random access memory unit coupled to the bus, and a storage device coupled to the bus. The storage device is configured to read a plurality of sectors in a selected partition. A set of sectors defines a data chunk such that the selected partition is processed as one or more data chunks. The computer system also includes means for sequentially storing a set of the data chunks in the order read from the partition in a selected backup volume and means for generating and storing a set of data chunk descriptors for referencing the stored data chunks in the selected backup volume. One data chunk descriptor is provided for each data chunk and the data chunk descriptors are stored in the selected backup volume after storing all of the set of data chunks. In addition, the computer system includes means for generating and storing address data descriptors for referencing at least one of the stored data chunks and at least one of the data chunk descriptors in the selected backup volume. The address data descriptors are stored in the selected backup volume after storing the data chunk descriptors.

In accordance with yet another aspect of the present invention, a method is provided for a computer readable medium. The computer readable medium is adapted to store computer executable instructions for providing data read from a storage device for storage in one or more backup volumes. The storage device has one or more partitions, each of which has a plurality of sectors. The computer executable instructions are suited for: (a) reading a plurality of sectors in a selected partition, wherein a set of sectors defines a data chunk such that the selected partition is read as one or more data chunks; (b) sequentially storing a set of the data chunks in the order read from the partition in a selected backup volume; (c) generating and storing a set of data chunk descriptors for referencing the stored data chunks in the selected backup volume, one data chunk descriptor per data chunk, the data chunk descriptors being stored in the selected backup volume after storing all of the set of data chunks; and (d) generating and storing address data descriptors for referencing at least one of the stored data chunks and at least one of the data chunk descriptors in the selected backup volume, the address data descriptors being stored in the selected backup volume after storing the data chunk descriptors.

The present invention advantageously provides an image backup method that supports spanning over multiple backup volumes. In addition, the backup method is optimized to store the data sectors in the order that they are read from a storage device to reduce seek operations over the backup media. Furthermore, the data sectors can also be accessed in the order that they appear on the original storage device to minimize backup media swapping and seek operations. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention is illustrated by way of example, and not by way of limitation, in the Figures of the accompanying drawings and in which like reference numerals refer to similar elements.

DETAILED DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details or by using alternate elements or processes. In other instances, well known processes, procedures, components, and circuits have not been described in detail so as to not obscure aspects of the present invention.

Figure 1:
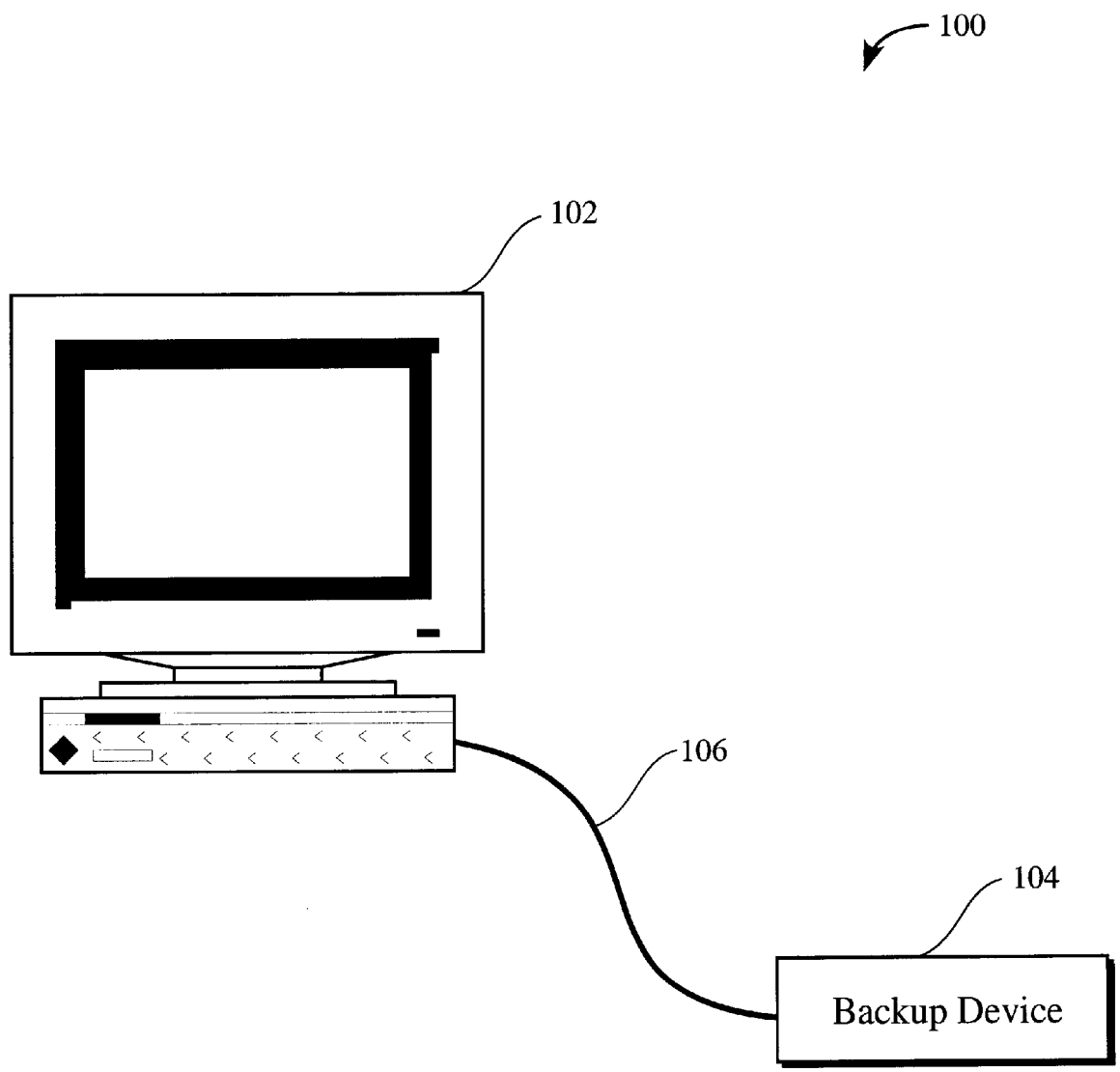
FIG. 1 illustrates an exemplary computer system including a host computer and a backup device.
Figure 2A:
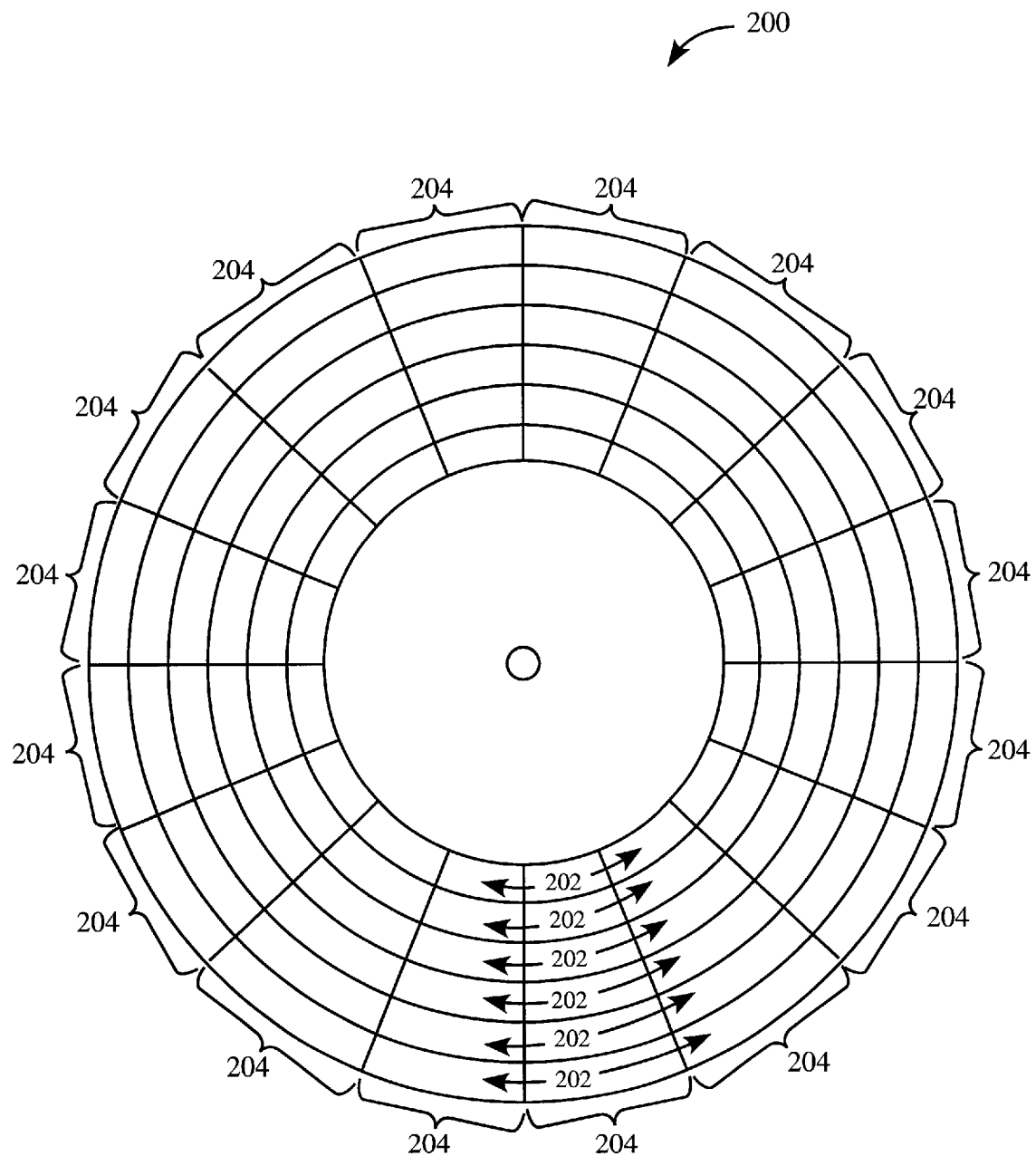
FIG. 2A illustrates a schematic diagram of an exemplary disk for storing data.
Figure 2B:
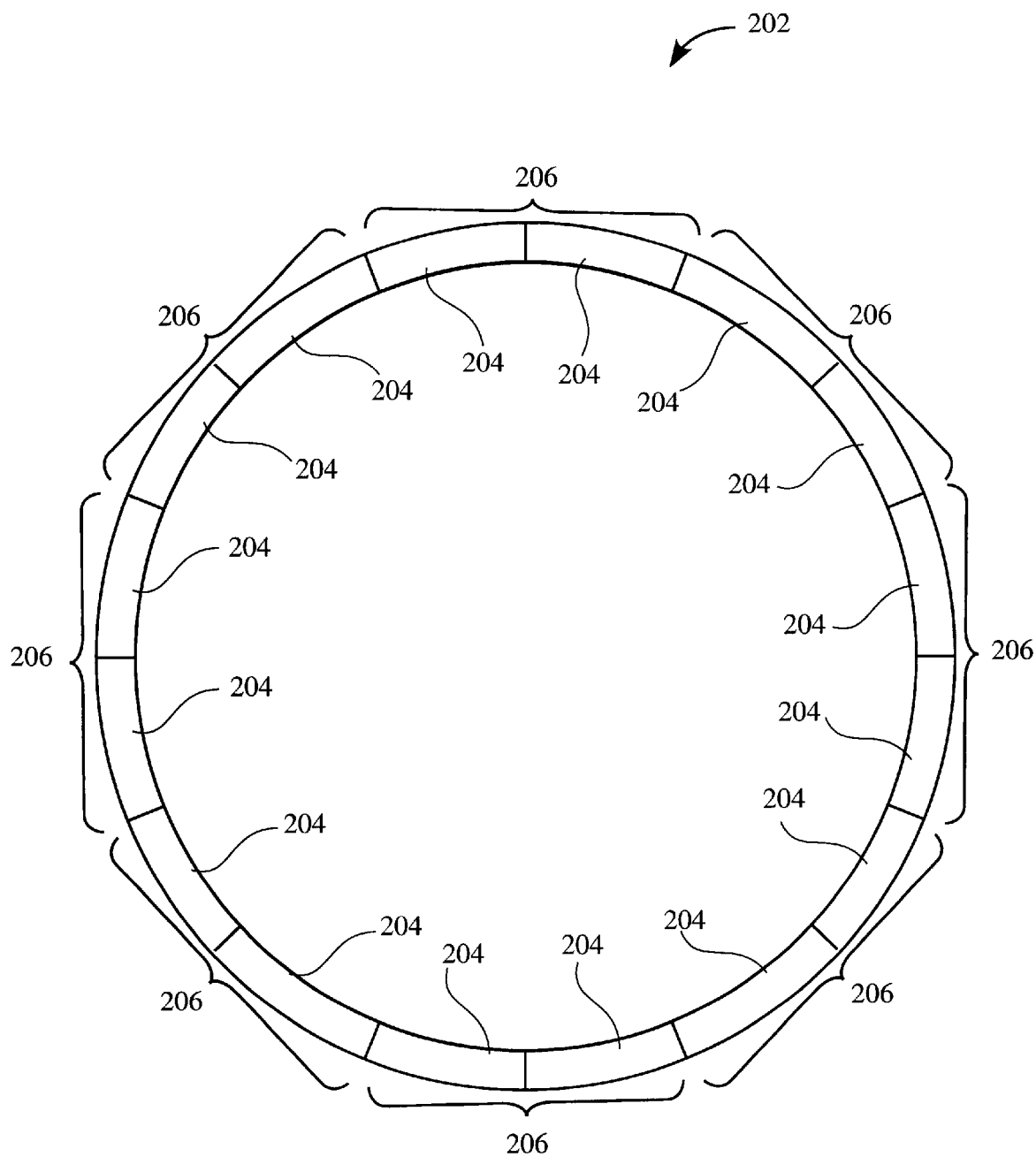
FIG. 2B shows a schematic diagram of an exemplary track divided into sectors.
Figure 3:
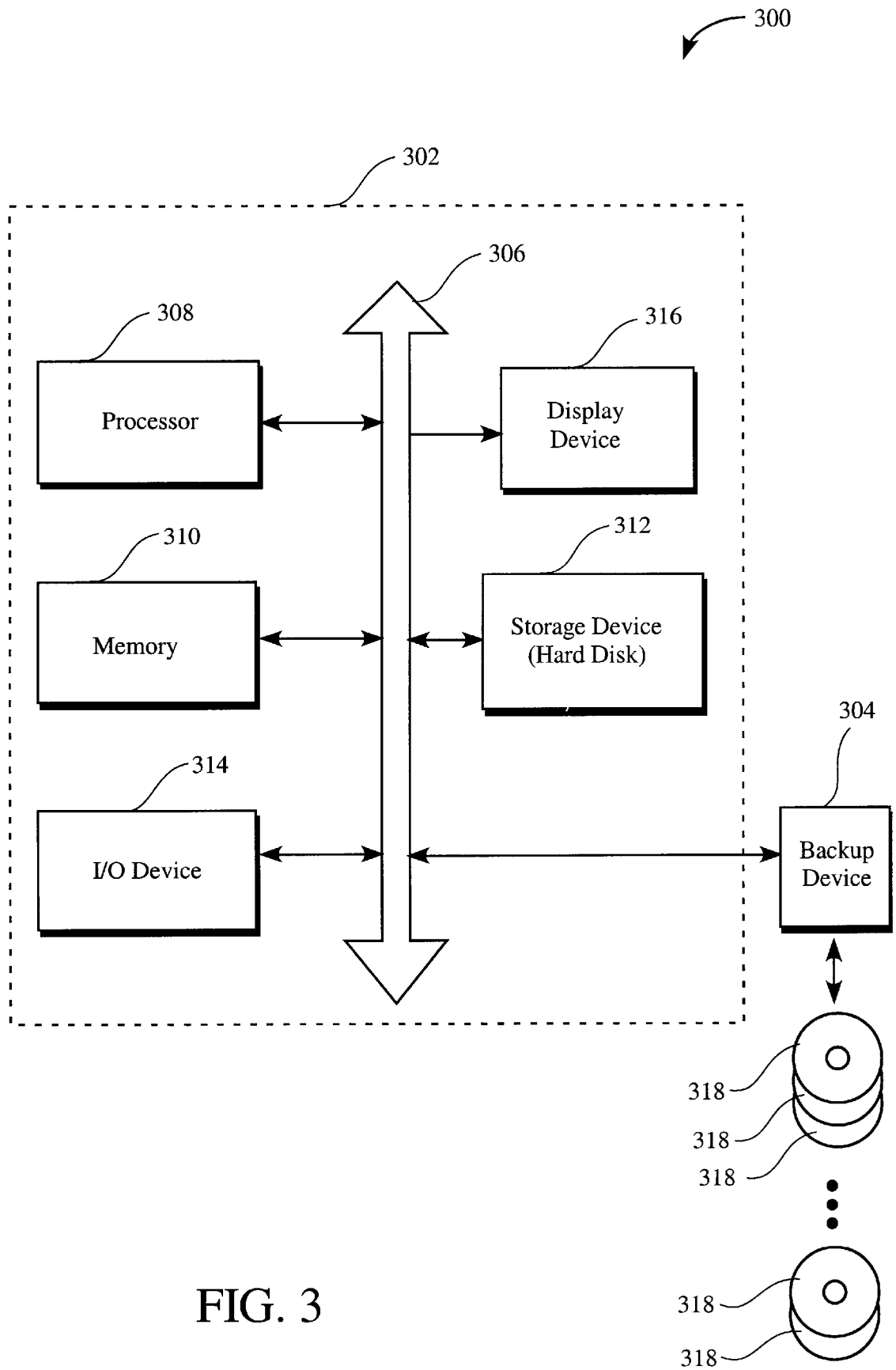
FIG. 3 shows a block diagram of an exemplary computer system including a host computer and a backup device in accordance with one embodiment of the present invention.

FIG. 3 shows a block diagram of an exemplary computer system 300 including the host computer 302 and the backup device 304 in accordance with one embodiment of the present invention. It should be appreciated that the computer system 300 is exemplary only and that the present invention can operate within a number of different computer system configurations including general purpose computer systems, embedded computer systems, and computer systems specially adapted to electronic design automation. In describing various embodiments of the present invention, certain processes and operations are realized as a series of instructions (e.g., software programs) that reside within computer readable memory units of computer system 300 and are executed by processors therein.

The host computer 302 includes a bus 306 for communicating information, a processor 308 coupled to the bus for processing information (e.g., instructions, programs, data, etc.), a memory 310 coupled to the bus 306 for storing information and instructions for the processor 308, and a storage device 312 coupled to the bus 306 for storing information and instructions. The backup device 304 is coupled to the bus 306 for backing up data from the storage device 312. The backup device 304 may be provided either internally within the host computer 302 or externally through a suitable cable. The backup device 304 is coupled to the computer system 300 through a bus such as SCSI, IDE, ATAPI, etc. The host computer 302 also includes and an I/O device 314 coupled to the bus for inputting and/or outputting information and a display device 316 coupled to the bus 306 for displaying information to the computer user.

The storage device 312 in the host computer 302 may include one or more hard disk drives, floppy disk drives, optical disk drives, tape drives, CD-ROM drives, or any number of other types of storage devices having media for storing data digitally. In accordance with a preferred embodiment, the storage device 312 is a fixed disk drive, which is a storage device with non-removable internal media and a relatively large storage capacity. The fixed disk drive may be partitioned to form smaller logical disk drives, i.e., partitions, which is a grouping of a single contiguous range of sectors on the fixed disk. For example, a user may partition a one Gigabyte fixed disk drive into two logical 500 Megabyte disks that are designated as "C:" and "D:" drives. In each partition, up to $2^N$ contiguous sectors may be grouped to define a cluster, where N is an integer greater than or equal to zero.

A partition contains files and directory bit maps such as file allocation table or the like. As used herein, the term "partition" refers to the smallest backup unit for image backup purposes and may be a subset of a larger "drive" or "disk." Although the present invention is illustrated by means of partition, it is equally applicable to larger units such as the drive or disk that may contain a plurality of partitions.

For backing up data from the storage device 312, the backup device 304 writes or records data to one or more backup media 318, one media at a time. That is, the backup device 304 receives data to be backed up from the storage device 312 and stores the data in one or more backup media 318. The backup media 318 may be any suitable magnetic or optical media, preferably having a predetermined data capacity. Preferably, the backup media 318 are removable optical media such as recordable or rewritable CD, DVD, or the like. However, the present invention may also employ any suitable removable or non-removable data storage media.

The backup device 304 may use as many backup media 318 as needed to backup desired amount of data from the storage device 312. As used herein, the backup media 318 that are actually used to store backup data from the storage device 312 are referred to as backup volumes. A set of backup volumes defines a backup set for the storage device 312. If the storage device 312 fails or the original data on the storage device 316 becomes corrupted, the backup device 304 provides the data stored in the backup set of volumes for restoring the original data.

The present invention provides methods for backing up data from and restoring backed up data to a storage device in a computer system. In particular, the methods of the present invention provide for storing data in backup media in a file format that facilitates restoring of the backed up data in an efficient manner. For example, the file format is configured to support spanning onto multiple backup volumes by first storing data chunks and then storing volume and/or partition ending data structures. The volume and/or partition ending data structures include data chunks descriptors for referencing the data chunks and address data descriptors for referencing the data chunks and data chunk descriptors.

Figure 4:
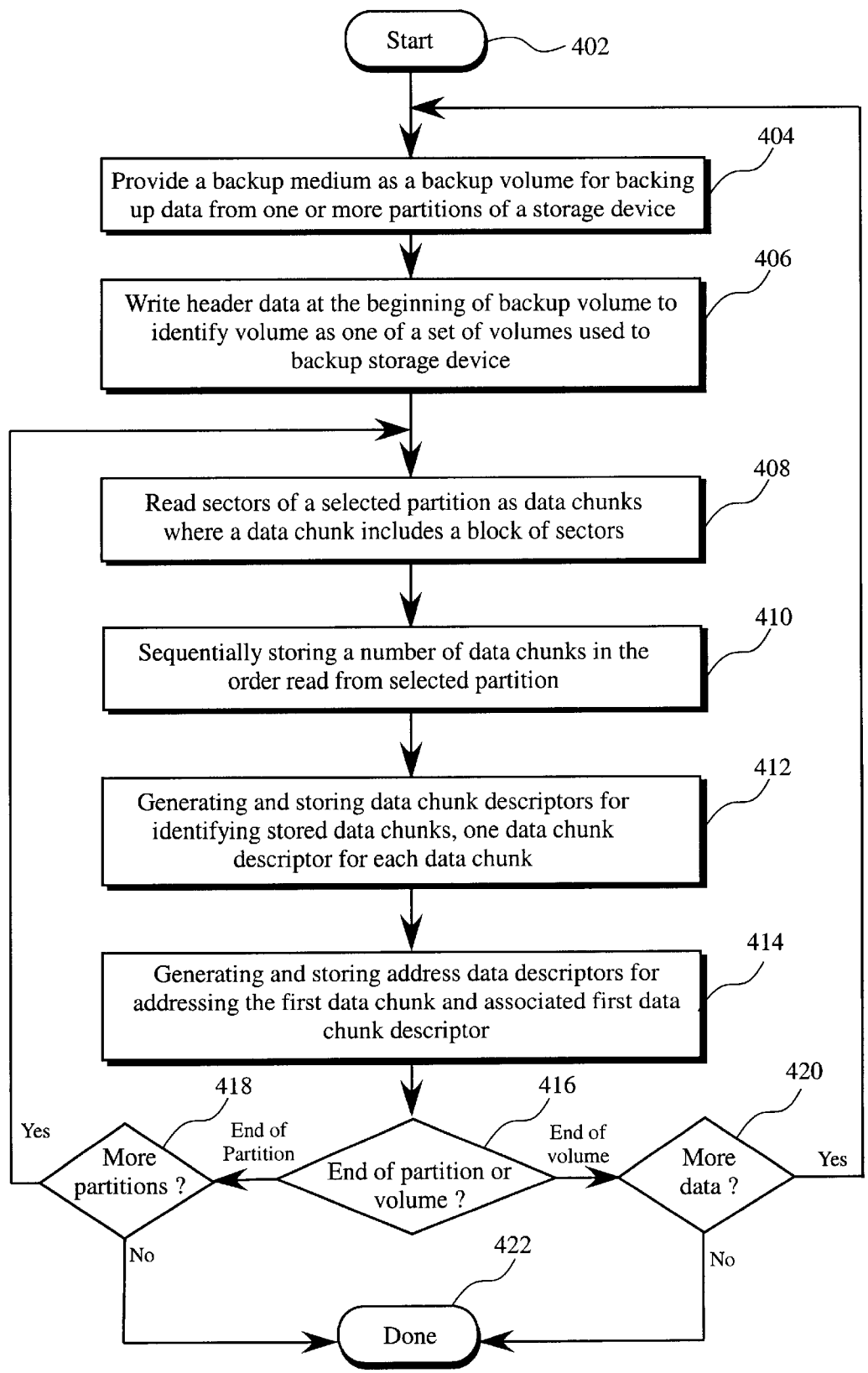
FIG. 4 shows a flowchart of an exemplary image backup method for storing data onto one or more backup media in a file format from one or more partitions of a storage device in accordance with one embodiment of the present invention.

FIG. 4 shows a flowchart of an exemplary image backup method for storing data onto one or more backup media in a file format from one or more partitions of a storage device in accordance with one embodiment of the present invention. The method begins in operation 402 and proceeds to operation 404, where a backup medium is selected and provided to a backup device as a backup volume for backing up data from one or more partitions of a storage device. Then, in operation 406, a header is written at the beginning of the backup medium to identify the volume as one of a set of volumes used to backup the storage device. The header is preferably a constant sized header that is identical for all volumes in the backup set.

Then in operation 408, the sectors of a selected partition in the storage device are read as data chunks, which is defined as a contiguous block of sectors. That is, a data chunk includes a predetermined number of sectors, preferably 128 sectors, which is 64 KB given a 512-byte sector. However, a data chunk may also be defined as any suitable number of contiguous sectors. In operation 410, a number of data chunks are sequentially stored in the order that they are read from the selected partition. The number of data chunks to be stored in the backup volume is automatically determined as data chunks are read in from the selected partition in view of data chunk descriptors, address data descriptors, and the storage capacity of the selected backup volume.

After storing the number of data chunks, data chunk descriptors are generated and stored, in operation 412, for identifying the stored data chunks in the volume. One data chunk descriptor is generated and stored for each data chunk stored. The data chunk descriptors are preferably stored in the selected backup volume after storing the data chunks. Then in operation 414, address data descriptors are generated and stored for addressing at least one of the stored data chunks and at least one of the data chunk descriptors in the selected backup volume. Preferably, the address data descriptors are stored in the selected backup volume after storing the data chunk descriptors.

In operation 416, it is determined whether the end of partition or volume is reached. If end of the partition has been reached, the method proceeds to operation 418, where it is determined if more partitions need to be backed up. If one or more partitions in the storage device need to be backed up, then the method proceeds back to operation 408 to read a next partition to be backed up. However, if no more partition needs to be backed up, then the method terminates in operation 422.

On the other hand, if end of the volume has been reached, the method proceeds to operation 420 to determine whether more data in the partition need to be backed up. If yes, the method proceeds back to operation 404 to provide another backup medium as a backup volume for storing the data If, however, the end of the volume has been reached and no more data need to be backed up, the method terminates in operation 422.

Figure 5:
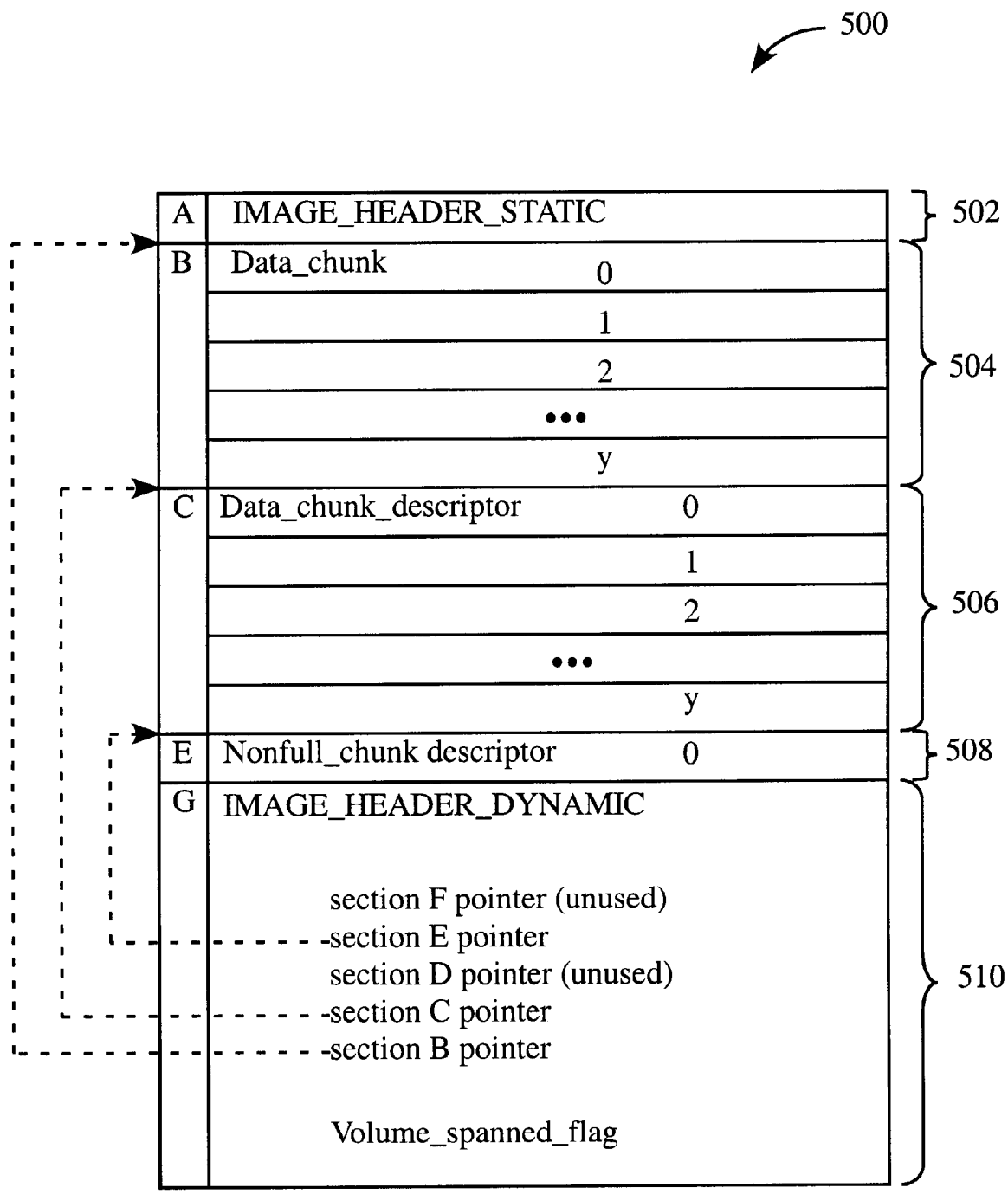
FIG. 5 illustrates a schematic block diagram of a backup volume depicting sections of a file format created in accordance with one embodiment of the present invention.

In accordance with some embodiments, the present invention generates a backup set containing one or more volumes 318 for a storage device. FIGS. 5 through 8 show a backup set including backup volumes 500, 600, and 700 for a storage device having two partitions, namely C: drive and D: drive. FIG. 5 illustrates a schematic block diagram of a first backup volume 500 depicting sections of a file format created in accordance with one embodiment of the present invention. The backup volume 318 is partitioned into five sections section "A" 502, section "B" 504, section "C" 506, section "E" 508, and section "G" 510. The section A includes a header, IMAGE_HEADER_STATIC, written at the beginning of the volume 500. The header is a constant-sized data structure that is written to all volumes in a backup set for identifying an associated backup set. For example, the header identifies the volume 500 as a volume in the backup set that includes volumes 500, 600, and 700.

After the header section "A" 502, data chunks, labeled Data_chunks 0 through y, are read from the first partition (i.e., C: drive) and stored in the data chunk section B 504 in the order read from the storage device. As described previously, a data chunk includes a set of contiguous sectors (e.g., 128 sectors). The number of data chunks that are stored in the volume 500 is determined dynamically by computing, as each data chunk is received, the storage requirements of other volume ending sections that are written after the data chunk section B504 in view of the specified storage capacity of the volume 500. For example, the maximum storage capacity of the volume 500 (e.g., 650 MB for a recordable or rewritable CD-ROM disk) and the data chunk size (e.g., 128 sectors or 64 KB) are set beforehand.

As will be appreciated, the size of each sector may also be set in accordance with the type of data structures included in the sectors. As each data chunk is received, the storage capacity needed to store the data chunk and the other sector data are computed based on the predetermined parameters of the sectors. If it is determined that the volume contains sufficient space to store a received data chunk along with other sector data, then the data chunk is stored in the volume 500.

When a data chunk is stored in the volume 500, a data chunk descriptor is generated for the data chunk and stored in a memory for the stored data chunk. The data chunk descriptor is a data structure that describes the associated data chunk and includes information such as size and location of the data chunk on the backup volume 500. The size of the data chunk is specified in the data chunk descriptor is useful, for example, when the data chunk is compressed for storage in the volume 500. In such case, the data chunk size along with the location of the data chunk provides sufficient information for accessing or retrieving the related data chunk.

As more data chunks are received and stored, the remaining space for recording a next data chunk and other sectors decreases until the remaining space in the volume 500 is computed to be insufficient to accommodate the next data chunk and the other sections. At this point, the volume 500 is closed by writing sections "C" 506, "E" 508, and "G" 510. The section "C" 506 contains the data chunk descriptors (Data_chunk_descriptor) 0 to y, which are associated with the data chunks 0 to y that have been stored in the volume 500. In particular, the data chunk descriptors 0 to y are stored in section "C" 506 in the same order as the data chunks in the section "B." Hence, the data chunks descriptors in section "C" 506 are stored in the order the data chunks are read from the storage device.

The ordering of the data chunk descriptors is configured to facilitate restoring of the backed up data chunks by reducing swapping of the volumes and seek operations in the volumes. Specifically, when a full system restoration using all three backup volumes 500, 600, and 700 is performed under an operating system such as DOS™, Windows®, or the like, the operating system may use the data chunk descriptors in section "C" 506 to reference only the data chunks that occur on the current volume. By thus providing data chunks and associated data chunk descriptors in the same volume, the physical reference or access to other volumes, which typically takes substantial amount of time compared to seek operations on the same volume, is minimized. Accordingly, the entire backup volume 500 may be accessed for backup without accessing another volume for data chunks.

In addition, the data chunk descriptors in section "C" 506 are configured to minimize seek operations on the backup volume 500. In particular, the sequential storage of the data chunks and associated data chunk descriptors allows substantially sequential access to a backup volume to minimize seek operations. Such sequential access enhances performance in backup devices that have a substantially larger seek time than a storage device. For instance, backup devices such as a re-writable or recordable CD-ROM drives typically have significantly larger seek time than a hard disk drive. In these cases, the faster hard disk drive may instead perform required seek operations during the restore operation to restore the image data.

After storing the data chunk descriptors in section "C" 506, a non-full chunk descriptor is generated and stored in section "E" 508. A non-fall chunk descriptor is provided in section "C" 508 for each stored data chunk that is not a full-sized chunk. That is, a data chunk of less than a full count of sectors is determined to be a non-full chunk. hi section "E" of volume 500, the first data chunk 0 is described by the non-full chunk descriptor 0.

For a 64 KB data chunk, the first data chunk will often be less than the fall chunk size because it contains essentially partition table, boot records, and the like. Similarly, the last data chunks of a partition will typically be less than the full chunk size because the last sectors of a partition is unlikely to match the full-chunk size. Accordingly, the first data chunk and the last data chunk of a partition are typically non-full chunks. Each of the non-full chunks are described by a non-full chunk descriptor having parameters such as size and location of the associated data chunk and the associated volume.

The non-full chunk descriptors thus allow efficient searching of the first and last data chunks. For example, the data chunks may be stored in a compressed form. In this case, all data chunks can be assumed to be of a specified size (e.g., 64 KB) when uncompressed with the exception of the first and the last data chunks. By providing the non-full chunk descriptors for the first and last data chunks, the first and the last data chunks can be located and accessed efficiently.

The volume 500 also contains address data descriptors under a heading IMAGE_HEADER_DYNAMIC in section "G" 510. The address data descriptors are configured to provide address references for accessing the data chunk and data chunk descriptor sections. In a preferred embodiment, the address data descriptors are provided by means of pointers for referencing the beginning of previous sections "B" through "E" within a volume. For example, section "G" 510 includes five pointers: section B pointer, section C pointer, section D pointer, section E pointer, and section F pointer. Each of the pointers is configured to point to the beginning of the associated section. For data chunk and data chunk descriptor sections, the pointers will point to the beginning address of the first data chunk and data chunk descriptors, respectively.

In the illustrated embodiment of volume 500, the section B, C, and E pointers are used to point to the beginning of sections B, C, and E, respectively. Preferably, the pointers point to the beginning of a first data chunk or a first data chunk descriptor. Even though present invention employs pointers, it may also employ any suitable means for addressing the sections. It should be noted that the section "G" 510 includes section D and F pointers, which are not used because sections D and F are not in the volume 500. The section "G" 510 also includes a flag, volume_spanned_flag, which indicates that volume spanning. That is, the current volume 500 is closed and the backup of the remaining data chunks continues in the next volume 600.

Figure 6:
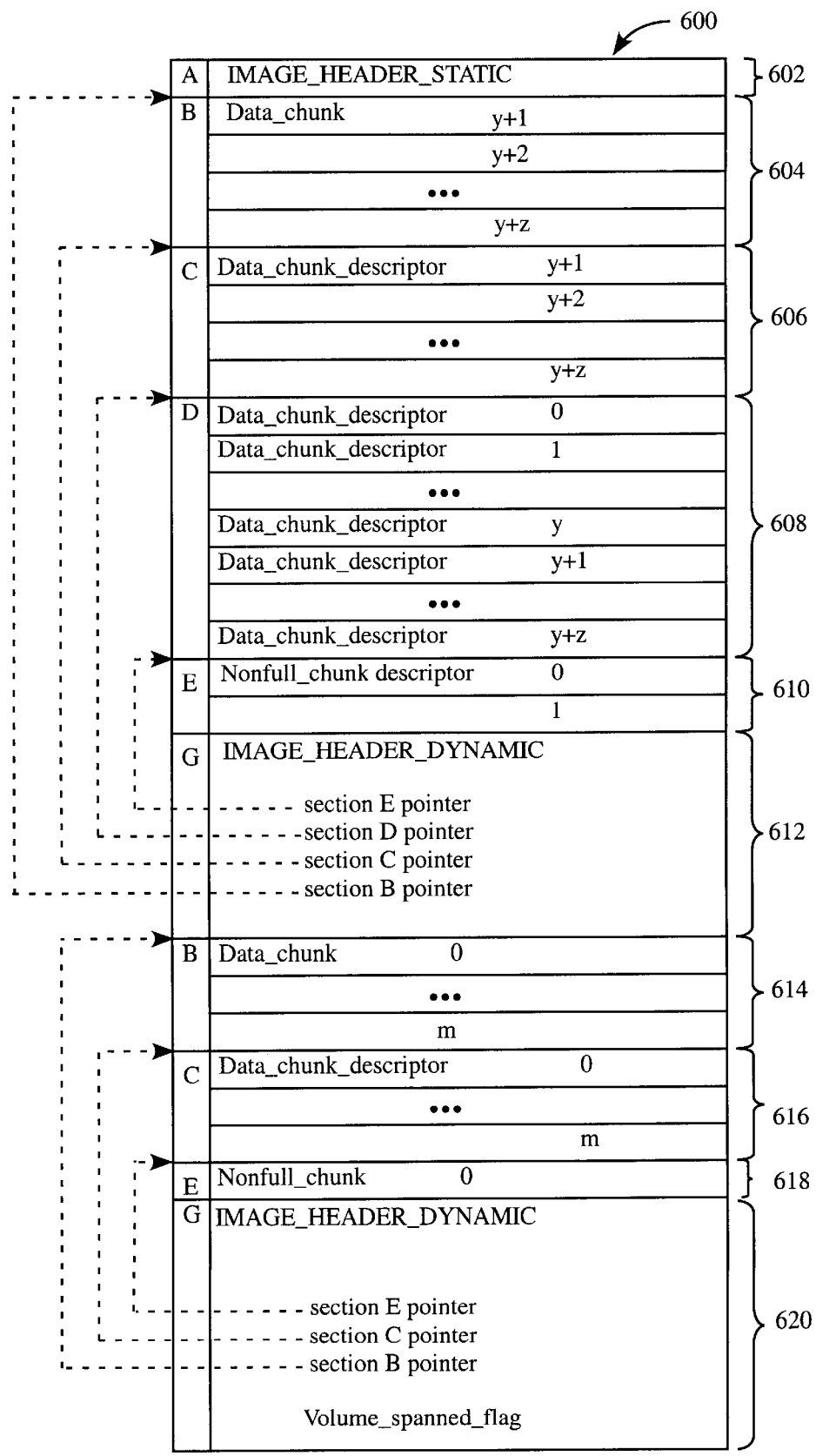
FIG. 6 shows an schematic block diagram of a second backup volume depicting an end of the first partition as well as an end of the volume.

FIG. 6 shows an schematic block diagram of the second backup volume 600 depicting an end of the first partition as well as an end of the volume 600. The volume 600 includes data from both the first and second partitions. The first partition (i.e., C: drive) is a continuation of the partition on the volume 500 and includes sections "A" 602, "B" 604, "C" 606, "D" 608, "E" 610, and "G" 612. The other partition (i.e., D: drive) is a new partition and includes sections "B" 614, "C" 616, "E" 618, and "G" 620.

Similar to volume 500, the second volume 600 is opened by writing a header in section "A" 602 for identifying the volume as one of the backup volumes. Then, the remaining data chunks (y+l) to (y+z) from the first partition are stored in section "B" 604 in volume 600 in the order read from the storage device. As each data chunks is stored, an associated data chunk descriptor is generated and stored in memory. After storing the data chunks (y+l) to (y+z), the data chunk descriptors describing the associated data chunks are stored in section "C" 606 in the same manner as in volume 500.

Upon storing the data chunks in section "C" 606, all the data chunk descriptors of all data chunks for the partition are accessed from memory and are sorted in the order that the data chunks appear in the original storage device. For example, the data chunk descriptors may be sorted in the sector order of the original source disk. Then, the data chunk descriptors are stored in section "D" 608 of volume 600 in the sorted order.

The storage of the data chunk descriptors in the sorted order allows simulation of a virtual file system of the original partition. For example, an application may reference specified sector data by referencing the data chunks in the order that the component sectors appear in the original disk. By thus providing an entire list of references to all data chunks of a partition, a specified data chunk or sector may be efficiently located. The simulation of file system thus allows random access to desired data sectors stored in a volume without performing a full restore operation. Of course, if the data chunk resides in another volume (e.g., volume 500), then a swapping of the volumes is necessary to access the actual data. Nevertheless, the sorted data chunk descriptors substantially improves performance because the application may read the data chunks in the order that they occur in the original disk. Such sequential access reduces seek time in the backup device, which typically has relatively large seek time.

With continuing reference to FIG. 6, the section "E" 610 contains a pair of non-fall chunk descriptors for the first partition. A nonfull_chunk descriptor 0 references the first data chunk while a nonfull-chunk descriptor 1 references the last data chunk in the partition. As described above, these non-full chunk descriptors contain information for referencing the associated data chunks such as size and location of the data chunk.

Similar to section "G" 510, the section "G" 612 includes section pointers for referencing the sectors in volume 600. Specifically, section B, C, D, and E pointers point to the beginning of sections "B" 604, "C" 606, "D" 608, and "E" 610. As described in conjunction with FIG. 5, these pointers are used to locate and access the sections in the volume 600. Sections "B" 604, "C" 606, "D" 608, and "D" are written to close the first partition.

After closing the first partition, the second partition is read and stored in a manner similar to the first partition. For example, the second partition is started at section "B" 614, where data chunks 0 through m are read and stored in a similar manner described above in connection with volume 500. Sections "C" 616, "E" 618, and "G" 620 are then written to close the volume 600. A flag, volume_spanned_flag, in section "G" 620 is set to indicate that the remaining data chunks of the second partition are stored in the next volume.

Figure 7:
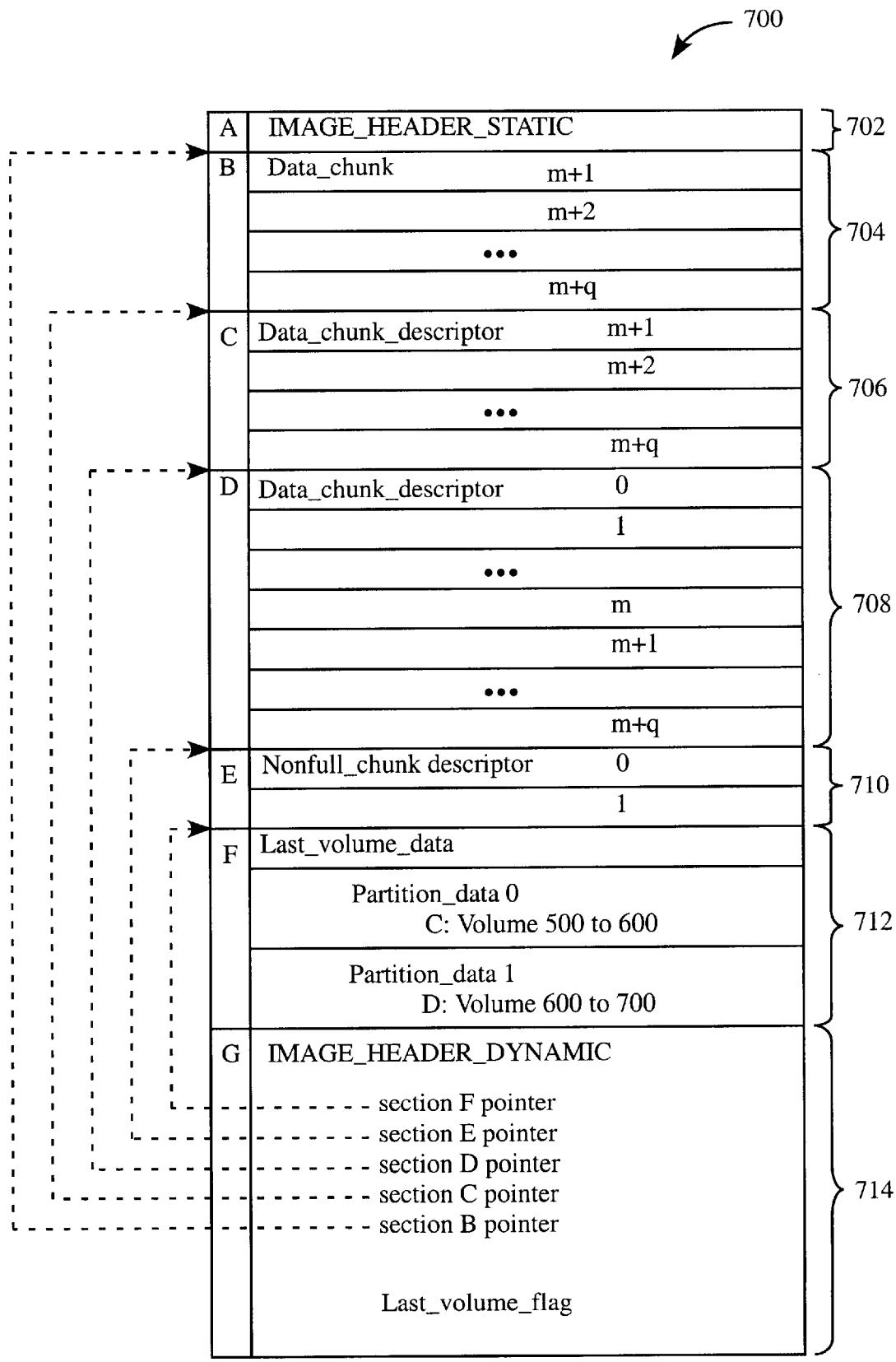
FIG. 7 shows a schematic block diagram of a volume illustrating a file format created in accordance with one embodiment of the present invention.

FIG. 7 shows a schematic block diagram of the last volume 700 illustrating a file format created in accordance with one embodiment of the present invention. The volume 700 includes sections "A" 702, "B" 704, "C" 706, "D" 708, "r" 710, "F" 712, and "G"714. The sections in the volume 700 are created in substantially similar manner as volumes 500 and 600. For example, in section "A" 702, a header for identifying the volume as a backup volume is written. Then, the remaining data chunks (m+1) through (m+q) are written in the order read from the storage device in section "B" 704. Next, section "C" 706 stores the data chunk descriptors (m+l) through (m+q) corresponding to each of the data chunks (m+l) through (m+q). As discussed above, the data chunk descriptors in section "C" 706 are stored in the same order as the data chunks in section "B" 704. In addition, section "D" 708 stores the sorted data chunk descriptors 0 to (m+q) in the order the associated data chunks are stored in the original storage device. Section "E" 710 contains non-full chunk descriptors 0 and 1 that correspond to the first and last data chunk descriptors. Section "F" 712 is created in the last volume of a backup set and includes descriptions of each partition contained in the backup set defined by volumes 500, 600, and 700. That is, section "F" 712 contains volume referencing data structure for identifying all volumes that contain data from the first and second partitions, i.e., C: and D: drive, respectively. For example, partition_data 0 identifies volumes 500 and 600 as containing data for the first partition C: drive. Likewise, partition_data 1 references volumes 600 and 700 as containing data for the second partition D: drive. Accordingly, the volume referencing data in section "F" are used to reference and access the volumes containing data for all partitions stored in the backup set. It should be noted that since volume 700 contains the partition data in section "F" 712, volume 700 is inserted first into a backup device at the beginning of a restore operation to access the mapping information of the partitions and associated volumes. Then, the other volumes containing the desired partition to be backed up may be inserted for restoring data from the partition.

After storing the volume referencing data in section "F" 712, address data descriptors are written in section "G" 714. The address data descriptors in section "G" 714 include section B, C, D, E, and F pointers for referencing sections "B" 704, "C" 706, "D" 708, "E" 710, and "F" 712, respectively. In addition, section "G" 714 also contains a flag, last_volume_flag, for indicating that the volume 700 is the last volume in the backup set.

The present invention, a method and system for backing up data over a plurality of volumes, is thus described. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. In a computer system, a method for backing up image data from one or more partitions of a storage device onto one or more backup media, the backup media being optical disc media, each backup medium defining a backup volume having a predetermined storage capacity, the one or more partitions having a plurality of sectors, the method comprising:
   a) reading the sectors of a selected partition of the storage device for backup in the one or more backup volumes, wherein a set of the sectors read from the selected partition for processing the sectors as data chunks;
   b) sequentially storing a set of the data chunks in the order read from the partition in a selected backup volume;
   c) generating and storing data chunk descriptors configured to reference the stored data chunks in the volume, one data chunk descriptor per data chunk, the data chunk descriptors being stored in the selected backup volume after storing all of the set of data chunks; and
   d) generating and storing address data descriptors configured to reference at least one of the stored data chunks and at least one of the data chunk descriptors in the selected backup volume, the address data descriptors being stored in the selected backup volume after storing the data chunk descriptors.

2. The method as recited in claim 1, wherein the set of data chunks are determined such that all of the set of data chunks, the data chunk descriptors, and the address data descriptors can be stored within the predetermined storage capacity of the selected backup volume.

3. The method as recited in claim 1, wherein the set of data chunks that can be stored in the selected backup volume is automatically determined as each data chunk read from the selected partition.

4. The method as recited in claim 2, further comprising:
   if the partition includes more data chunks to be backed up than the set of data chunks,
   e) providing a new backup medium as a new backup volume; and
   f) repeating operations a) through e) for backing up the more data chunks in the new backup volume.

5. The method as recited in claim 2, further comprising:
   if the storage device includes more partitions to be backed up,
   g) repeating operations a) through d) for each of the more partitions.

6. The method as recited in claim 5, wherein if a partition includes more data chunks to be backed up than the set of data chunks stored in the selected backup volume, the method further comprises:
   h) providing a new backup medium as a new backup volume; and
   i) repeating operations a) through h) for backing up the more data chunks in the new backup volume.

7. The method as recited in claim 1, wherein each of the data chunk descriptors includes a size and location of an associated data chunk in the selected backup volume.

8. The method as recited in claim 5, wherein each of the data chunk descriptors includes a size and location of an associated data chunk in the associated selected backup volume.

9. The method as recited in claim 1, wherein the operation c) further comprises:
   sorting the data chunk descriptors in an order as appearing on the selected partition; and
   storing the sorted data chunk descriptors in the order of appearance in a last volume for the partition.

10. The method as recited in claim 1, wherein the operation c) further comprises:
    identifying data chunks that contain less than a full block of the sectors as non-full data chunks; and
    storing data chunk descriptors for the non-full data chunks as non-full data chunk descriptors.

11. The method as recited in claim 5, wherein the address data descriptors include a set of pointers configured to point to a first data chunk and a first data chunk descriptor stored in the selected backup volume.

12. The method as recited in claim 5, wherein the operation e) further comprises:
    writing a first flag on the selected backup volume before providing the new backup volume, the first flag indicating that the new backup volume contains more backed up data.

13. The method as recited in claim 12, wherein when the new backup volume is a last volume used in backing up, a last volume flag is written to indicate that the new backup volume is the last volume.

14. The method as recited in claim 13, wherein when the new backup volume is the last volume, the method further comprises:
  identifying backup volumes used to store each of the partitions; and
  storing the backup volume identity for each of the partitions.

15. The method as recited in claim 5, wherein a header is written at the beginning of each of the selected backup volumes used in backing up partitions to identify the selected backup volumes as having backed up data.

16. The method as recited in claim 1, wherein the sectors in the data chunks are contiguous.

17. The method as recited in claim 1, wherein the address data descriptors are used to access at least one of the stored data chunks and at least one of the data chunk descriptors for restoring backed up the data chunks onto a second storage device.

18. The method as recited in claim 17, wherein the second storage device is the storage device from which data chunks are read for backup.

19. The method as recited in claim 1, wherein the storage device is a hard disk drive and the backup media are optical discs.

20. A computer system for backing up data from one or more partitions of a storage device onto one or more backup media, the backup media being optical disc media, each backup medium defining a backup volume having a predetermined storage capacity, the one or more partitions having a plurality of sectors, the system comprising:
  a processor coupled to a bus;
  a random access memory unit coupled to the bus;
  a storage device coupled to the bus and being configured to read a plurality of sectors in the one or more partitions, a set of the sectors defining a data chunk for processing the sectors as data chunks;
  means for sequentially storing a set of the data chunks in the order read from the partition in a selected backup volume;
  means for generating and storing a set of data chunk descriptors for referencing the stored data chunks in the selected backup volume, one data chunk descriptor per data chunk, the data chunk descriptors being stored in the selected backup volume after storing all of the set of data chunks; and
  means for generating and storing address data descriptors for referencing at least one of the stored data chunks and at least one of the data chunk descriptors in the selected backup volume, the address data descriptors being stored in the selected backup volume after storing the data chunk descriptors.

21. The system as recited in claim 20, wherein the set of data chunks are determined such that all of the set of data chunks, the data chunk descriptors, and the address data descriptors can be stored within a predetermined storage capacity of the selected backup volume.

22. The system as recited in claim 20, wherein the set of data chunks that can be stored in the selected backup volume is automatically determined as each data chunk read from the selected partition.

23. The system as recited in claim 20, wherein each of the data chunk descriptors includes a size and location of an associated data chunk in the selected backup volume.

24. The system as recited in claim 20, further comprising:
  means for sorting the data chunk descriptors in an order as appearing on the selected partition; and
  means for storing the sorted data chunk descriptors in the order of appearance in a last volume for the partition.

25. The system as recited in claim 20, wherein the address data descriptors include a set of pointers configured to point to a first data chunk and a first data chunk descriptor stored in the selected backup volume.

26. The system as recited in claim 20, wherein a header is written at the beginning of the selected backup volume to identify the selected backup volumes as having backed up data.

27. The system as recited in claim 20, wherein the address data descriptors are used to access at least one of the stored data chunks and at least one of the data chunk descriptors for restoring backed up the data chunks onto a second storage device.

28. A computer readable medium storing computer executable instructions for providing data read from a storage device for storage in one or more backup volumes, each backup volume being defined by an optical disc medium, the storage device having one or more partitions, each partition having a plurality of sectors, the computer executable instructions suitable for:
  reading a plurality of sectors in a selected partition, wherein a set of sectors defines a data chunk such that the selected partition is read as one or more data chunks;
  sequentially storing a set of the data chunks in the order read from the partition in a selected backup volume;
  generating and storing a set of data chunk descriptors for referencing the stored data chunks in the selected backup volume, one data chunk descriptor per data chunk, the data chunk descriptors being stored in the selected backup volume after storing all of the set of data chunks; and
  generating and storing address data descriptors for referencing at least one of the stored data chunks and at least one of the data chunk descriptors in the selected backup volume, the address data descriptors being stored in the selected backup volume after storing the data chunk descriptors.

29. The method as recited in claim 28, wherein the set of data chunks are determined such that all of the set of data chunks, the data chunk descriptors, and the address data descriptors can be stored within a predetermined storage capacity of the selected backup volume.

30. The system as recited in claim 28, wherein the set of data chunks that can be stored in the selected backup volume is automatically determined as each data chunk read from the selected partition.

31. The system as recited in claim 28, wherein each of the data chunk descriptors includes a size and location of an associated data chunk in the selected backup volume.

32. The system as recited in claim 28, further comprising:
  sorting the data chunk descriptors in an order as appearing on the selected partition; and
  storing the sorted data chunk descriptors in the order of appearance in a last volume for the partition.

33. The system as recited in claim 28, wherein the address data descriptors include a set of pointers configured to point to a first data chunk and a first data chunk descriptor stored in the selected backup volume.

34. The system as recited in claim 28, wherein the address data descriptors are used to access the at least one of the stored data chunks and the at least one of the data chunk descriptors for restoring backed up the data chunks onto a second storage device.

* * * * *